March 15, 1932.   F. N. BARD   1,849,702

FLUID DELIVERY

Filed July 31, 1920

Inventor:
Francis Norwood Bard
by attorney

Patented Mar. 15, 1932

1,849,702

UNITED STATES PATENT OFFICE

FRANCIS NORWOOD BARD, OF HIGHLAND PARK, ILLINOIS

FLUID DELIVERY

Application filed July 31, 1920. Serial No. 400,478.

The present invention relates in general to fluid delivery and more particularly to mechanism for controlling the delivery of a fluid, and has special reference to the delivery of an operating fluid under desired predetermined pressures.

The principal objects of the present invention are the provision of the delivery of a fluid at a predetermined pressure; the provision of a plurality of sources of actuating power to be brought into operation one upon the failure of the other; the provision of a plurality of sources of fluid pressure, the delivery of the one being controlled by the pressure of another; the provision of a valve mechanism for controlling the delivery of power from a plurality of sources; the provision of a valve mechanism controlled by one source of fluid pressure for delivering fluid pressure from another source; the provision of a valve mechanism arranged to deliver power from an auxiliary source upon failure of power from the primary source; and the provision of an improved and simplified arrangement for delivering fluid under proper pressure.

Mechanism of the character referred to have a general field of usefulness, and are of particular utility where two independent sources of fluid pressure are available as in steam engines.

In attaining these objects, and such other objects as may appear or be set out hereafter, I have illustrated an embodiment of my invention in the accompanying drawings, wherein—

Figure 1:
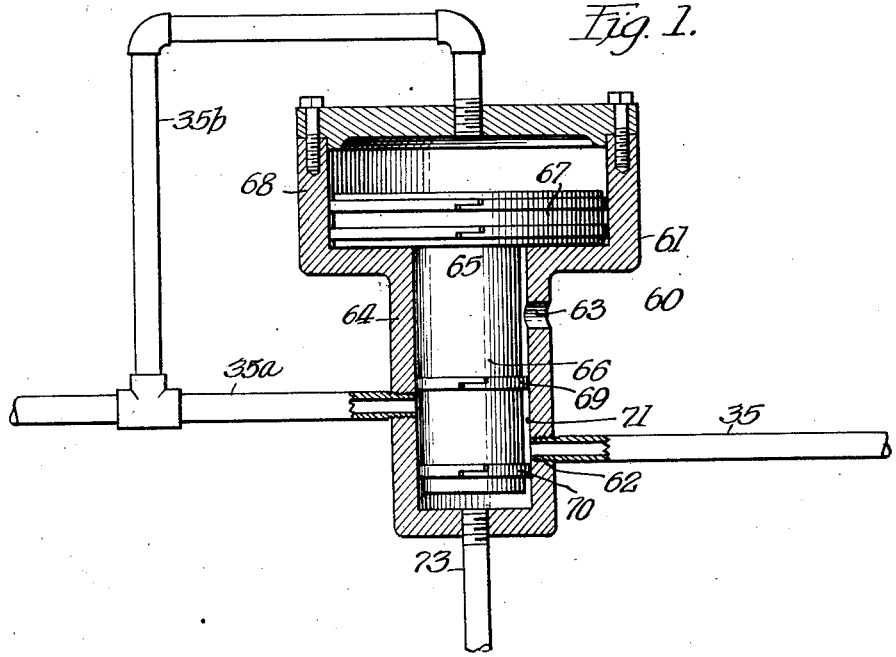
Figure 2:
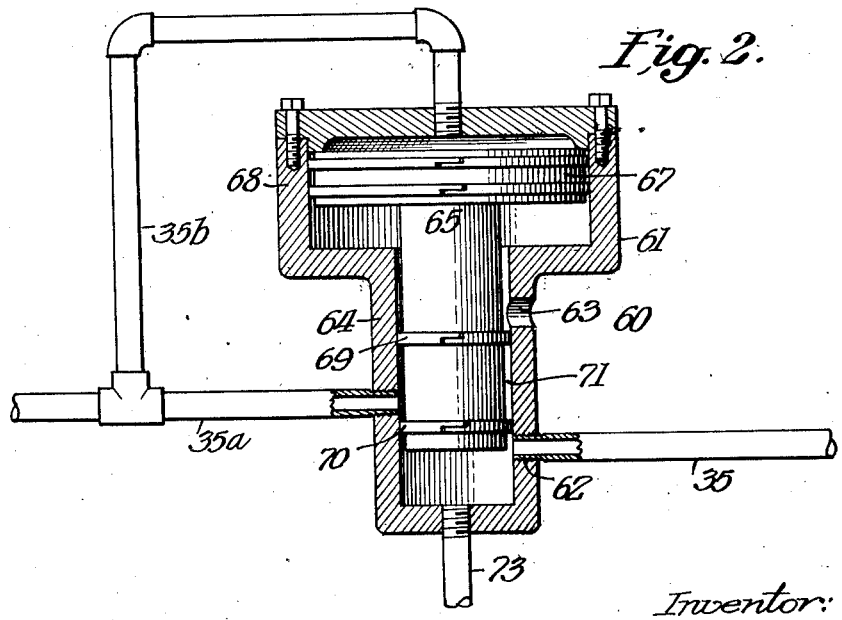

Figure 1 is an elevational view partly in section showing the valve in one extreme of its movement; and Figure 2 is a view similar to that of Figure 1, showing the valve in the other extreme of its movement.

In order to make provision for the delivery of fluid, in the event of the failure of supply of the primary fluid introduced through the pipe 35, I have provided, as will be evident on viewing the figures of the drawings, an auxiliary source of actuating fluid.

In order to render this auxiliary fluid available, I have interposed in the pipe line, 35, means for causing such auxiliary fluid to be automatically delivered into the pipe 35, and means for controlling such automatic delivery.

In order to accomplish this delivery, I preferably employ the valve mechanism indicated generally at 60 now to be described.

This valve mechanism includes a casing, 61, provided at 62 with a connection to the pipe line, 35, and at 63 with a vent to the atmosphere.

In the form shown the casing, 61, has a cylindrical portion of reduced diameter at one end, as indicated at 64, and has slidably mounted therein a differential piston valve device, 65, one end, 66, of which is disposed in the smaller portion, 64, of the casing, 61, and the larger end 67, of which is disposed in the enlarged end, 68, of the casing, 61.

The piston valve device, 65, has its stem portion, 66, provided with a pair of spaced snap rings, 69—70, having fluid tight bearing against the wall of the cylinder, 64.

The two rings, 69—70, form between them a limited circumferential passage, 71, around the stem, 66. The pipe, 35, is in communication with the passage, 71, when the piston, 65, is in one part of its traverse, and the passage, 71, is always in communication with primary fluid supply pipe, 35a. This supply pipe, 35a, is in turn connected by a branch, 35b, with the enlarged end, 68, of the casing, 61, and behind the larger area, 67, of the piston, 65.

The smaller end, 64, of the casing, 61, is connected, behind the smaller area, 66, of the piston, 65, to an auxiliary source of fluid pressure, such as steam, conveyed by the pipe, 73.

In the operation of the device when in its normal position, as shown in Figure 1, where the valve is at the extreme limit of its traverse in one direction, and assuming compressed air from the main air reservoir supplied through the pipe, 35a, as the primary actuating fluid, and steam at boiler pressure as the auxiliary actuating fluid, inasmuch as for purposes of illustration, I have shown my present invention in a form adapted for approved railway practice, the primary or air supply from the pipe, 35a, passes through the circumferential passage, 71, into the pipe, 35, the valve device, 65, being held in the position shown in said Figure 1 by the primary fluid pressure delivered against the larger area, 67, of the piston, 65, through the pipe 35b.

In the event, however, of variation of pressure in the connected pipes 35a and 35b which would render the pressure in the pipe 35 insufficient to operate the reversing gear mechanism, the relative pressures on the differential areas of the piston device, 65, will be such that the piston 65, will be moved by the auxiliary fluid pressure delivered against the smaller area, 66, of the piston, 65, through the pipe, 73, thus interrupting the communication through which the primary actuating fluid normally flows from the pipe 35a to the pipe 35. Concurrently, the passage, 35, will be placed in open communication with the pipe, 73, through which the auxiliary fluid supply flows.

It will readily be understood that the function of the vent, 63, serves to equalize the pressure behind the ring, 69, and the piston head 67.

Those who are skilled in the art will appreciate that the use of a differential piston is desirable, inasmuch as the air pressure in the main reservoir is under usual operating condition but a fraction of that of steam at boiler pressure; that a great advantage of the present invention resides in this that it is unnecessary to await the accumulation of air under pressure in the main reservoir, before the reversing gear mechanism can be operated by power, since all that is required is a sufficient supply of steam under pressure; and that a further advantage resides in the fact that at no time under normal operating conditions can the reversing gear fail to act owing to lack of fluid pressure.

Obviously, the passage of fluid through the pipe, 73, may be controlled by a valve under the hand of the engineer.

Having thus described my invention and illustrated its use, what I claim as new and desire to secure by Letters Patent is—

1. A device of the character described for regulation of the passage of a plurality of fluids under independently generated pressures, one of which fluids is a first or primary fluid, and the other of which fluids is a second or secondary fluid, said device including means for controlling the flow of one of said fluids, said means including a valve actuated by the pressure of said first fluid for closing off the flow of said second fluid against the pressure of the latter, said means being adapted to be moved in turn by said second fluid on failure of sufficient pressure of the first fluid.

2. In a device in which a secondary fluid under pressure is adapted to cooperate with a primary fluid under pressure, said pressures being independently generated, means for receiving said secondary fluid, and independent means for receiving said primary fluid, means for controlling the flow of said secondary fluid including a valve actuated by pressure of the primary fluid for closing the supply of said secondary fluid, said means being in turn moved by the pressure of the secondary fluid when the latter is sufficient to overcome the pressure of said primary fluid to render said secondary fluid available.

In testimony whereof I have hereunto signed my name.

FRANCIS NORWOOD BARD.